US008774267B2

(12) United States Patent
Gaddy et al.

(10) Patent No.: US 8,774,267 B2
(45) Date of Patent: Jul. 8, 2014

(54) SYSTEM AND METHOD FOR TRANSMISSION, PROCESSING, AND RENDERING OF STEREOSCOPIC AND MULTI-VIEW IMAGES

(75) Inventors: William L. Gaddy, Milford, PA (US); Vidhya Seran, Irving, TX (US); Yong Liu, Edison, NJ (US)

(73) Assignee: Spinella IP Holdings, Inc., Colts Neck, NJ (US)

( * ) Notice: Subject to any disclaimer, the term of this patent is extended or adjusted under 35 U.S.C. 154(b) by 572 days.

(21) Appl. No.: 12/880,426

(22) Filed: Sep. 13, 2010

(65) Prior Publication Data

US 2012/0008672 A1    Jan. 12, 2012

Related U.S. Application Data

(60) Provisional application No. 61/362,134, filed on Jul. 7, 2010.

(51) Int. Cl.
| | |
|---|---|
| *H04N 11/02* | (2006.01) |
| *H04N 7/46* | (2006.01) |
| *H04N 7/26* | (2006.01) |
| *G06T 1/00* | (2006.01) |
| *H04N 7/32* | (2006.01) |
| *H04N 13/02* | (2006.01) |
| *H04N 13/00* | (2006.01) |

(52) U.S. Cl.
CPC ... *H04N 19/00757* (2013.01); *H04N 19/00557* (2013.01); *H04N 13/0011* (2013.01); *G06T 1/0028* (2013.01); *H04N 19/00769* (2013.01); *H04N 13/0275* (2013.01); *H04N 13/0059* (2013.01); *H04N 2213/003* (2013.01); *H04N 13/0007* (2013.01); *H04N 13/0048* (2013.01)

USPC .................................................. 375/240.01

(58) Field of Classification Search
CPC ..... H04N 9/735; H04N 1/58; H04N 5/23254; H04N 19/00769; H04N 13/0007; H04N 13/0275; H04N 19/00557; H04N 13/0048; H04N 13/0011; H04N 13/0059; H04N 2213/003; G06T 1/0028
USPC .............. 375/240; 348/43; 382/261; 345/419
See application file for complete search history.

(56) References Cited

U.S. PATENT DOCUMENTS

| 6,055,330 | A  | * | 4/2000  | Eleftheriadis et al. | ......... 382/154 |
| 6,148,027 | A  | * | 11/2000 | Song et al. | .................... 375/240 |
| 6,473,516 | B1 | * | 10/2002 | Kawaguchi et al. | .......... 382/100 |
| 7,477,777 | B2 | * | 1/2009  | Wells | ............................ 382/154 |
| 2003/0235338 | A1 | * | 12/2003 | Dye | ............................. 382/232 |

(Continued)

OTHER PUBLICATIONS

"Overview of MPEG Standards for 3DTV," Motorola Corporation, 2010.

(Continued)

*Primary Examiner* — William C Vaughn, Jr.
*Assistant Examiner* — Naod Belai
(74) *Attorney, Agent, or Firm* — Lowenstein Sandler LLP

(57) ABSTRACT

A digital image processing system takes color plus Z channel data as input, preprocesses, decimates, and codes the Z channel in-band as digital watermark data embedded within the color data prior to encoding and transmission. A second digital image processing system receives, decodes, and extracts the decimated Z channel data before applying statistical regularization to restore a full-resolution Z channel prior to depth-image-based rendering.

17 Claims, 11 Drawing Sheets

(56) References Cited

U.S. PATENT DOCUMENTS

2006/0221250 A1* 10/2006 Rossbach et al. ............. 348/630
2010/0239180 A1*  9/2010 Yea et al. ...................... 382/261
2010/0309287 A1* 12/2010 Rodriguez ..................... 348/43
2012/0200669 A1*  8/2012 Lai et al. ........................ 348/43

OTHER PUBLICATIONS

Yang et. al., "Improved Real-Time Stereo on Commodity Graphics Hardware," Proceedings of the 2004 Conference on Computer Vision and Pattern Recognition Workshop (CVPRW'04) vol. 3, 2004.

Diaz et. al.,"Real-Time System for High-Image Resolution Disparity Estimation," IEEE Trans Image Process., Jan. 2007;16(1):280-5.

Morvan et al., "Platelet-based coding of depth maps for the transmission of multiview images," in Stereoscopic Displays and Virtual Reality Systems XIII. Edited by Woods, Andrew J. et al., Proceedings of the SPIE, vol. 6055, pp. 177-188 (2006).

by Tam et al., "Non-Uniform Smoothing of Depth Maps Before Image-Based Rendering," in Three-Dimensional TV, Video, and Display III, Edited by Javidi, Bahram; Okano, Fumio, Proceedings of the SPIE, vol. 5599, pp. 173-183 (2004).

Emoto, et al., "Working Towards Developing Human Harmonic Stereoscopic Systems," in: Three-Dimensional Imaging, Visualization, and Display, edited by B. Javidi et al. (Springer-Verlag, New York, 2008) pp. 417-466.

Tam et al., "Depth Map Generation for 3-D TV: Importance of Edge and Boundary Information," in: Three-Dimensional Imaging, Visualization, and Display, edited by B. Javidi et al. (Springer-Verlag, New York, 2009) pp. 153-182.

* cited by examiner

SYSTEM AND METHOD FOR TRANSMISSION, PROCESSING, AND RENDERING OF STEREOSCOPIC AND MULTI-VIEW IMAGES

CROSS-REFERENCE TO RELATED APPLICATIONS

This application claims the benefit of U.S. Provisional Patent Application No. 61/362,134 filed Jul. 7, 2010, the disclosure of which is incorporated herein by reference in its entirety.

FIELD OF THE INVENTION

The present invention relates generally to digital image-processing systems for the transmission and reception of depth information along with color information (e.g., RGB data), and more particularly, to a method and a digital image-processing system for receiving and using depth information and color information transmitted by a first digital image-processing system to render one or more three-dimensional (3D) views (e.g., stereoscopic or auto-stereoscopic views).

BACKGROUND OF THE INVENTION

Three-dimensional (3D) video and image transmission systems and 3D television (3D-TV) in particular have gained market acceptance in recent years. In order to present a 3D stereoscopic image to a viewer according to prior art systems, it is necessary to generate at least two separate views, with one intended for the viewer's left eye, and the other intended for the viewer's right eye. Certain prior art 3D-TV systems and methods have been designed to provide compatibility with existing television transmission standards. Examples include frame-compatible packing methods, one of which is described in "Overview of MPEG Standards for 3DTV," Motorola Corporation, 2010 obtained from http://www-.mpegif.org/m4if/bod/Working%20Groups/WP_MPEG-_Standards_for_3DTV.pdf on Aug. 11, 2010, which is incorporated herein by reference in its entirety. If not directly stated, all documents/papers/articles referenced in the specification are herein incorporated by reference in their entirety.

In essence, a frame-compatible packing method operates by packing two stereoscopic views (i.e., the right-eye view and the left-eye view) into a normal-resolution frame, such as in a side-by-side or over-under configuration. While this method certainly permits transmission of 3D TV content over existing channels, unfortunately, a viewer with an older 2D television will see a packed frame that is not viewable without a 3D-TV, or at least a 3D-aware set-top box or TV. Additionally, this prior art method suffers from significant resolution degradation, as half of the resolution per-frame is sacrificed in order to squeeze two stereoscopic frames (i.e., left-eye and right-eye) into one. In addition to resolution degradation, television system operators such as broadcasters, cable, and satellite operators employing this conventional system/method are required to deploy a new set of transponders, increased bandwidth, or additional channels to broadcast 3D-TV in this manner, leading to significant expenses.

Another drawback to the frame-compatible packing transmission method is that the amount of disparity between each eye is fixed at the time of transmission, causing displays of varying sizes at the receiver system to exhibit vastly varying disparities. The end user has very little opportunity to adjust real disparity to compensate for these problems. At best, baseline disparity may be adjusted, in theory, by displacing a left eye presentation relative to the right eye presentation as images are viewed on a 3D-TV. Unfortunately, inter-object disparity cannot be adjusted.

Other methods known in the art address many of the foregoing issues by encoding view-to-view prediction out-of-band, as described in an amendment to the H.264/AVC video compression standard for Multiview Video Coding (i.e., "*ISO/IEC 14496-10, Advanced Video Coding, Annex H: Multiview Video Coding*"). Many compatibility issues have been ameliorated by encoding a second (or other) view in a bit-stream in such a way that an older codec will discard the extra data, thus rendering a single 2D view. Broadcasts encoded this way benefit by not requiring new channels to be allocated; the same channel may be used to transmit 2D and 3D broadcasts. However, like frame-packing methods, the end user has no granular control over disparity at the point of viewing. As before, at best, the viewer could theoretically control baseline disparity, but not real inter-object disparities.

Furthermore, overhead associated with such coding schemes for a stereo broadcast is 25 to 35 percent, and therefore requires significant bandwidth upgrades for operators. Present bandwidth allocation in video distribution of this kind will therefore grow accordingly. Additionally, such overhead costs impose incremental costs on backhaul—for example, the same video channels cannot use the same number of satellite transponders. Another major problem with methods based on H.264/AVC is that it is assumed that the entire infrastructure is built out upon H.264/AVC, which is not the case. Most U.S. domestic video distribution infrastructure is still based upon MPEG2. As such, the transmission of H.264/AVC video requires a major upgrade to broadcast and distribution encoding infrastructure for those still using MPEG2, a very expensive proposition. Further, it requires that operators absorb significant costs associated with upgrading customer-premise equipment to support the new standard for anyone wishing to receive 3D-TV broadcasts, resulting in an additional capital expense that frame-compatible methods do not impose.

Accordingly, what would be desirable, but has not yet been provided, is a system and method for transmitting stereoscopic image data at low or no incremental bandwidth cost, with complete backward compatibility with existing transmission chains, including, but not limited to, MPEG2 encoding and decoding, and for providing a method for a high quality reconstruction of the transmitted stereoscopic image data at a receiver system.

SUMMARY OF THE INVENTION

The above-described problems are addressed and a technical solution is achieved in the art by providing a transmitter and a computer implemented method configured to transmit three-dimensional (3D) imagery, comprising the steps of extracting a depth map (i.e., a Z channel) and color data from at least one 3D image; reducing bandwidth of the depth map to produce a reduced bandwidth depth map; inserting the reduced bandwidth depth map into the color data to produce a reduced bandwidth 3D image; and transmitting the reduced bandwidth 3D image into a transmission channel for delivery to a display. As used herein, the term "Z channel" describes a depth map of a single channel of image data, where each pixel of the data represents the range or distance of each pixel of a corresponding color image.

According to an embodiment of the present invention, reducing bandwidth of the depth map comprises retaining at least one region of the depth map comprising at least one discontinuity that corresponds to at least one object boundary in the color data. Reducing bandwidth of the depth map may further comprise removing depth values associated with a modality in a distribution representing depth values in the depth map. According to an embodiment of the present invention, the method may further comprise identifying the modality by: generating a histogram of depth values in the depth map, and performing a modal analysis on the histogram. The method may further comprise applying a grayscale morphological closing operation on the histogram to remove 0.0 or 1.0 depth values. The term "modality" is intended to refer to a principal component in the frequency of occurrence of a value, such as in a frequency histogram of the depth values. Such a modality would be indicated by large local maxima of the frequency distribution(s). When referring to 0.0 or 1.0 depth (Z) values, what is intended is a normalized depth map or depth map having a range from 0.0 to 1.0, where 0.0 indicates a distance at infinity, 1.0 represents a point arbitrarily close to the camera, and 0.5 represents the natural convergence point of the camera system.

According to an embodiment of the present invention, the method may further comprise filtering the depth map with a median image processing filter. The median image processing filter may be a 5×5 median filter.

According to an embodiment of the present invention, the method may further comprise performing a spatial decimation operation on the depth map, and applying a lossless method of statistical coding on the depth map. Performing a spatial decimation operation on the depth map may comprise at least one of applying a cubic reduction filter to the depth map and performing a repeated succession of one-octave bicubic reductions. Applying a lossless method of statistical coding on the depth map may further comprise at least one of: transforming the depth map to a 7-bit-per-pixel representation and encoding statistically with a Huffmann encoding scheme, applying arithmetic coding to the depth map, and applying a two-dimensional codebook encoding scheme to the depth map.

According to an embodiment of the present invention, inserting the reduced bandwidth depth map into the color data may further comprise adding the depth map to color data as a watermark.

The above-described problems are addressed and a technical solution is achieved in the art by also providing a receiver and a computer implemented method for receiving three-dimensional (3D) imagery, comprising the steps of: receiving a reduced bandwidth 3D image comprising a reduced bandwidth depth map and color data; and applying a filter that employs a statistical domain of the color data to restore bandwidth of the reduced bandwidth depth map. The filter is configured to restore discontinuities in the reduced bandwidth depth map by matching discontinuities of the color data containing at least one object boundary. The method may further comprise applying a depth-image-based rendering (DIBR) method to warp the restored depth map and the color image to construct at least one view suitable for stereoscopic or auto-stereoscopic 3D displays.

According to an embodiment of the present invention, the at least one filter is a RGBZO filter. The RGBZO filter employs two radiosity weighting functions provided by the reduced bandwidth depth map as a first domain, the color data as a second domain, and a spatial weighting function.

According to an embodiment of the present invention, the method may further comprise the step of repeatedly subjecting the reduced bandwidth depth map to iterations of one-octave bicubic up-scaling followed by application of the RGBZO filter until a first octave up-scaled depth map is produced. Repeatedly subjecting the reduced bandwidth depth map to iterations of one-octave bicubic up-scaling followed by application of the RGBZO filter may minimize an error function comprising a difference between an edge gradient of the depth map and a color edge gradient of the color data to regularize output of the up-scaled depth map.

According to an embodiment of the present invention, the method may further comprise the step of applying a lossless decoding method to the reduced bandwidth depth map before said step of repeatedly subjecting the reduced bandwidth depth map to iterations of one-octave bicubic up-scaling followed by application of the RGBZO filter.

According to an embodiment of the present invention, step of applying a (DIBR) method may further comprise the steps of: applying an optical flow method to the color data; applying motion compensation and image warping to the color to produce a table of motion compensated pixels; applying one of temporal predictions and spatial predictions of candidate occluded pixels from the table of motion compensated pixels; applying a statistical in-painting procedure to the candidate occluded pixels; and warping pixels obtained from the statistical in-painting procedure to obtain left and right eye views of images for display. The method may further comprise the steps of: classifying disocclusions from the depth map to inform spatial predictions of candidate occluded pixels; and applying a Z smoothing method to the depth map to produce a processed depth map. The step of warping is informed by the processed depth map.

According to an embodiment of the present invention, the transmitter and/or receiver may be implemented using an application-specific integrated circuit (ASIC).

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
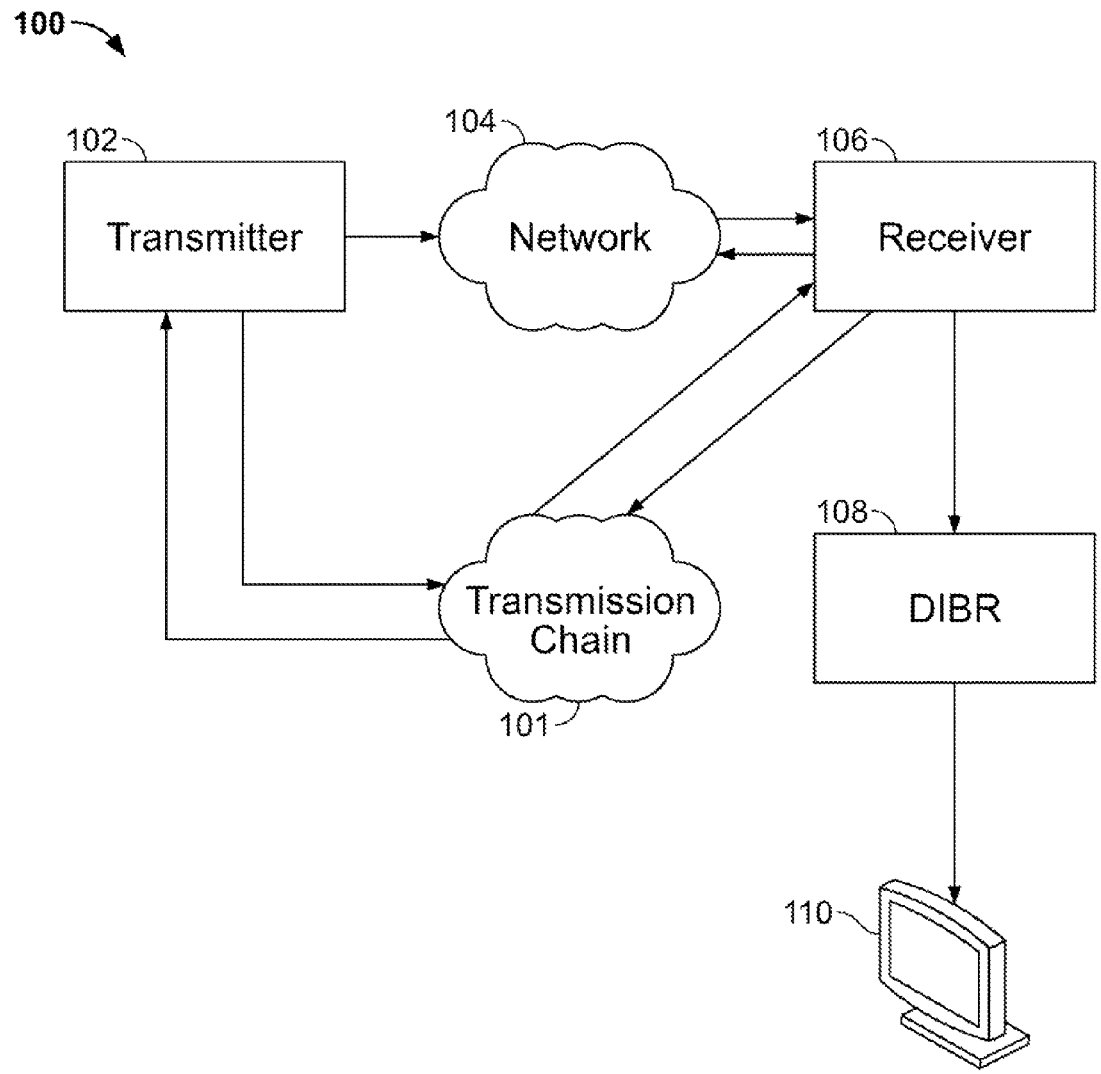
FIG. 1 depicts a block diagram of an exemplary 3D digital processing system, according to an embodiment of the present invention.

The present invention relates to a computer implemented image processing method and system for transmitting and receiving three-dimensional (3D) images. FIG. 1 depicts a block diagram of an exemplary 3D digital processing system 100, according to an embodiment of the present invention. The system 100 includes a computer-implemented receiver 102, a computer implemented transmitter 104, an optional depth-image-based rendering (DIBR) module 108 to be described hereinbelow, and an optional display 110. The system 100 does not include but employs a network 104 communicatively connected to the transmitter 102 and the receiver 104. The transmitter 102 receives 3D stereoscopic image data comprising color data (e.g., RGB, YUV, etc.) from a transmission chain 101 or generates the 3D stereoscopic image data within the transmitter 102. The transmitter 102 reduces bandwidth depth information (i.e., the Z channel) of the 3D stereoscopic image data at low or no incremental bandwidth cost, with complete backward compatibility with the existing transmission chain 101, including, but not limited to, MPEG2 encoding and decoding.

The color data and reduced bandwidth Z channel is transmitted by the transmitter 102 over the communicatively connected network 104 to the computer-implemented receiver 106 that reconstructs stereoscopic images from the color data and the reduced bandwidth Z channel using a filter according to an embodiment of the present invention to be described hereinbelow. The optional depth-image-based rendering (DIBR) module 108, to be described hereinbelow, is configured to warp the restored Z channel and the color data to construct at least one view (e.g., a left-eye image or right-eye image) suitable for stereoscopic or auto-stereoscopic 3D displays 110. The term "depth-image-based rendering" refers to a technique for creating a novel view from the input of an image, and a depth map. There are many depth-image-based rendering methods known in the art—a typical process employs a horizontal pixel offset for each pixel of an input image. The offset's magnitude is calculated to be in proportion to the depth map pixel value in concert with an assumed convergence point, where a given depth map value (say, 0.5) is assumed to present a zero offset. Depth values more or less than this convergence point value are assigned leftward or rightward pixel offsets, respectively.

According to an embodiment of the present invention, the receiver 106 may further transmit the reconstructed stereoscopic images back through the transmission chain 101.

The term "computer" or "computer platform" is intended to include any data processing device, such as a desktop computer, a laptop computer, a mainframe computer, a server, a handheld device, a digital signal processor (DSP), an embedded processor (an example of which is described in connection with FIGS. 2A and 2B hereinbelow), or any other device able to process data. The term "communicatively connected" is intended to include any type of connection, whether wired or wireless, in which data may be communicated. The term "communicatively connected" is intended to include, but not limited to, a connection between devices and/or programs within a single computer or between devices and/or separate Computers over a network. The term "network" is intended to include, but not limited to, OTA (over-the-air transmission, ATSC, DVB-T), video over packet-switched networks (TCP/IP, e.g., the Internet), satellite (microwave, MPEG transport stream or IP), direct broadcast satellite, analog cable transmission systems (RF), digital video transmission systems (ATSC, HD-SDI, HDMI, DVI, VGA), etc.

The transmitter 102 may comprise any suitable video transmission device, such as, for example, cameras with embedded transmission functions, camera transceiver systems, a video encoding appliance, a video statistical multiplexing appliance (statmux), computers with video capture cards, computers with attached cameras media servers that are spooling/streaming video files, PCs that are spooling/streaming video files, etc. The receiver 106 may comprise any suitable 3D video reception device, including optionally, the DIBR module 108 and the display 110. Suitable 3D video reception devices may comprise, for example, PCs, tablets, mobile phones, PDAs, video decoding appliances, video demultiplexing appliances, televisions, television distribution Devices (e.g., AppleTV™), television set-top boxes, and DVRs.

If the Z channel data is embedded in-band (i.e., within a 3D color image to be transmitted), for example using a steganographic method, then certain embodiments of the system 100 provide fully backward and forward-compatible 2D and 3D video signaling and transmission. The term "steganographic" generally refers to hiding information in images. Within the context of the transmission system 102, the term "steganographic" refers to a means of embedding or hiding a Z channel within the color image data in such a way as to not be visible or apparent to a human viewer.

Still further, if the display 110 is an autostereoscopic display, no glasses are required to view the 3D imagery on the display 110.

Figure 2A:
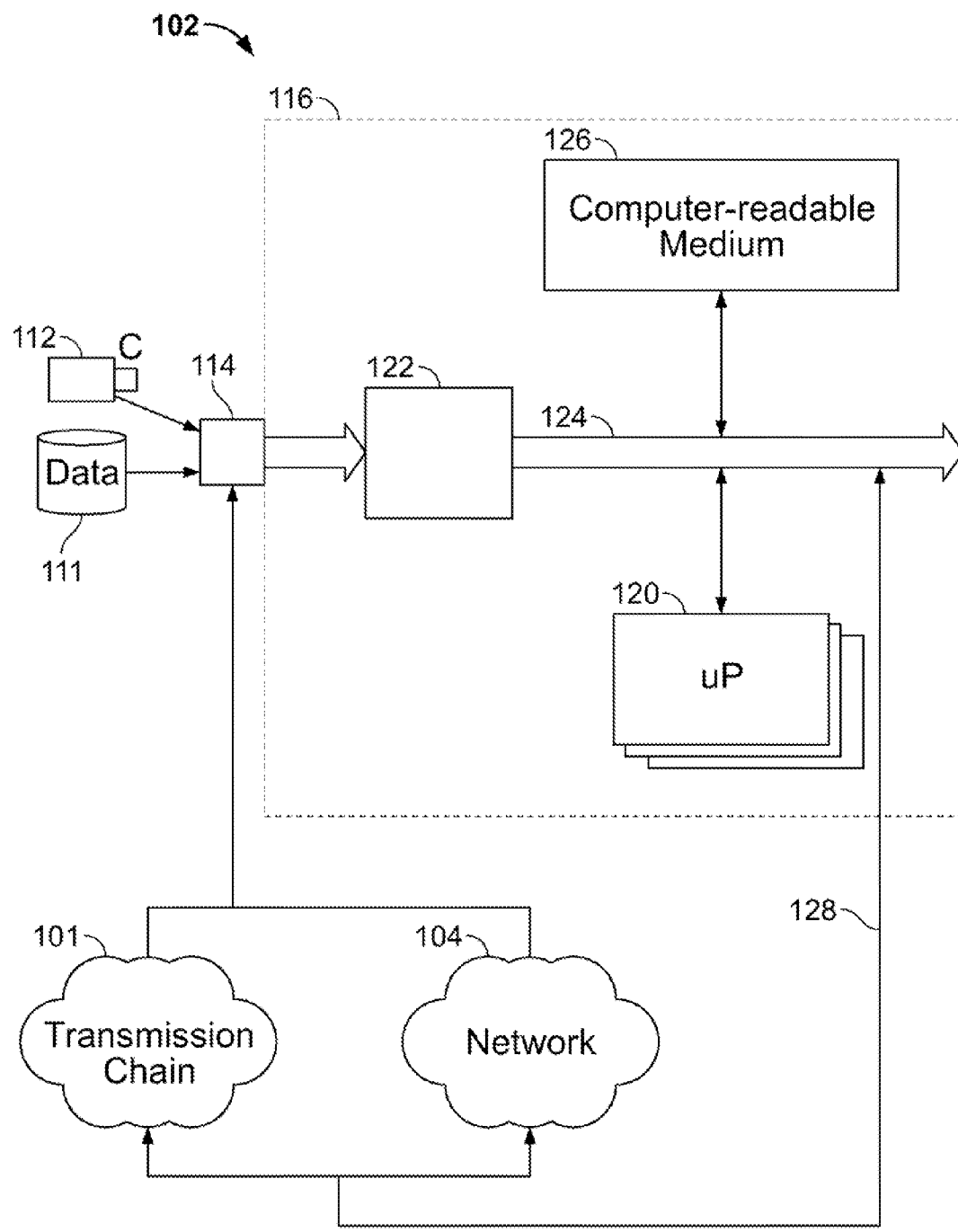
FIG. 2A is a hardware block diagram of an exemplary transmitter of FIG. 1 for stereoscopic displays, according to an embodiment of the present invention.
Figure 7:
FIG. 7 shows an example of a left and right eye stereoscopic image pair.

FIG. 2A depicts a block diagram of an exemplary transmitter 102, according to an embodiment of the present invention. By way of a non-limiting example, the transmitter 102 receives digitized 3D video or still images comprising a depth map (i.e., a Z channel) and color data (collectively referred to as "a 3D image") from one or more data storage systems 111, and/or one or more image capturing devices 112 (e.g., one or more still or video cameras, shape cameras, LIDAR or IR photogrammetry-generated range devices), and/or from the existing transmission chain 101. According to an embodiment of the present invention the one or more 3D images may be synthetically estimated, or calculated from stereo image pair disparity values, such as the example shown in FIG. 7.

Optionally, the digitized video or still images may be received via a network 113, such as the Internet. According to an embodiment of the present invention, the transmitter system 102 includes a computing platform 116, and may also optionally include a digital video capture system 114. The digital video capturing system 114 processes streams of digital video, or converts analog video to digital video, to a form which can be processed by the computing platform 116. The digital video capturing system 114 may be stand-alone hardware, or cards such as Firewire cards which can plug directly into the computing platform 116. According to an embodiment of the present invention, the image capturing devices 112 may interface with the video capturing system 114/computing platform 116 over a heterogeneous data link, such as a radio link (e.g., between a satellite and a ground station) and a digital data link (e.g., Ethernet, between the ground station and the computing platform 116). The computing platform 116 may include a personal computer or work-station (e.g., a Pentium-M 1.8 GHz PC-104 or higher) comprising one or more processors 120 which includes a bus system 122 which is fed by video data streams 124 via the one or more processors 120 or directly to a computer-readable medium 126. Alternatively, the computing platform 116 may be implemented as or part of an integrated circuit, such as a graphics processing unit (GPU) or digital signal processor (DSP) implemented in an field-programmable gate array (FPGA) or an application-specific integrated circuit (ASIC).

The computer-readable medium 126 may also be used for storing the instructions of the transmitter system 102 to be executed by one or more processors 120, including an optional operating system, such as a Windows or the Linux operating system. The computer-readable medium 126 may further be used for storing and retrieving video clips of the present invention in one or more databases. The computer-readable medium 126 may include a combination of volatile memory, such as RAM memory, and non-volatile memory, such as flash memory, optical disk(s), and/or hard disk(s). Portions of a processed video data stream 128 may be stored temporarily in the computer-readable medium 126 for later output to a network 104, such as the Internet, and/or to the transmission chain 101.

Figure 2B:
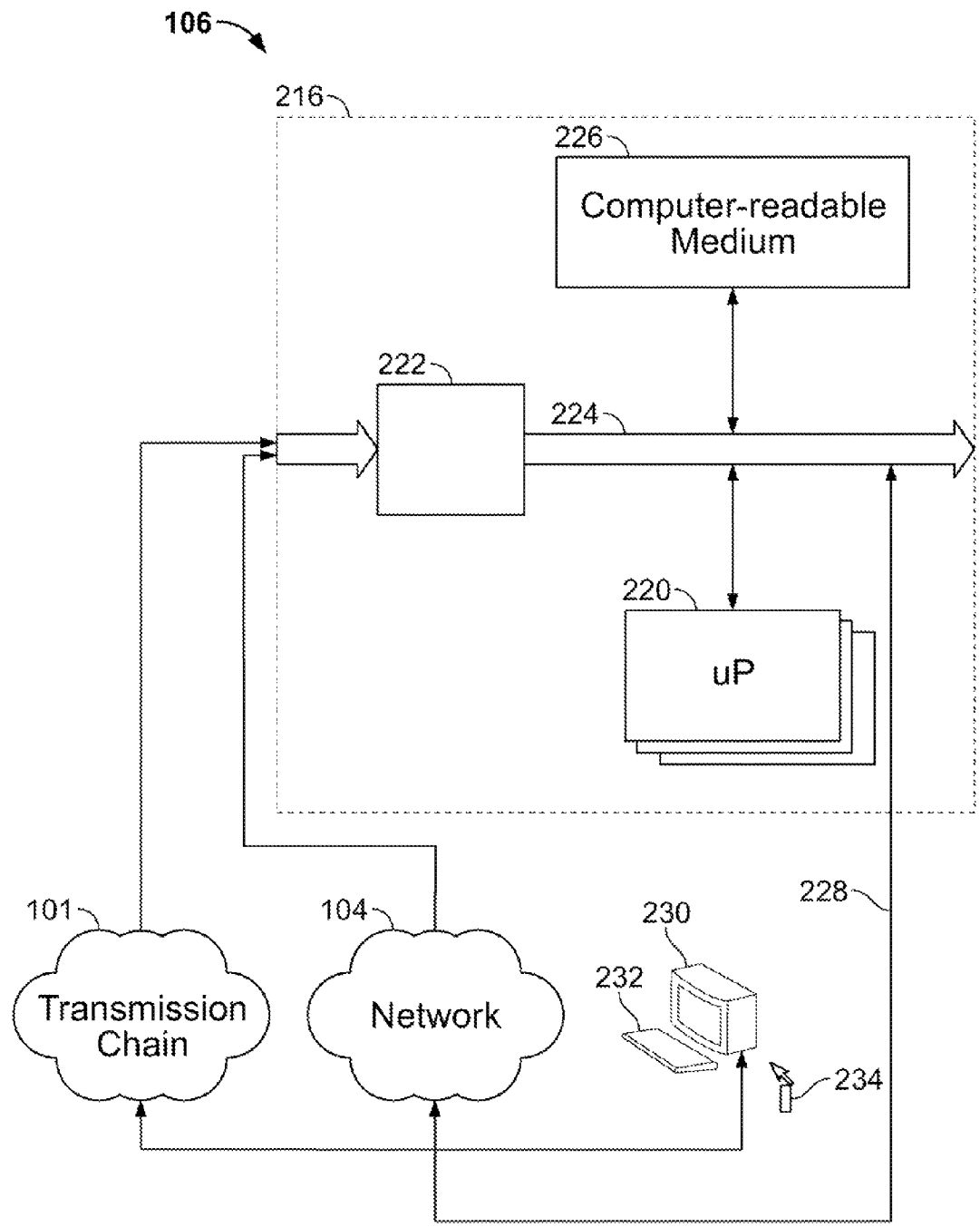
FIG. 2B is a hardware block diagram of an exemplary receiver of FIG. 1 for stereoscopic displays, according to an embodiment of the present invention.

FIG. 2B is a block diagram of an exemplary 3D receiver 106, according to an embodiment of the present invention. By way of a non-limiting example, the receiver 106 receives digitized and processed 3D video or still images comprising color data and a reduced bandwidth Z channel (collectively referred to as "a reduced bandwidth 3D image") from the transmitter via a network 104, such as the Internet, and/or from the existing transmission chain 101. The receiver 106 may also include a computing platform 216. The computing platform 216 may include a personal computer or work-station (e.g., a Pentium-M 1.8 GHz PC-104 or higher) comprising one or more processors 220 which includes a bus system 222 which is fed by video data streams 224 via one or more processors 220 or directly to a computer-readable medium 226. Alternatively, the computing platform 216 may be implemented as or part of an integrated circuit, such as a graphics processing unit (GPU) or digital signal processor (DSP) implemented in an FPGA or ASIC.

The computer-readable medium 226 may also be used for storing the instructions of the receiver 106 to be executed by one or more processors 220, including an optional operating system, such as a Windows or the Linux operating system. The computer-readable medium 226 may further be used for the storing and retrieving of processed video of the present invention in one or more databases. The computer-readable medium 226 may include a combination of volatile memory, such as RAM memory, and non-volatile memory, such as flash memory, optical disk(s), and/or hard disk(s). Portions of a processed video data stream 228 comprising a "restored" depth map (i.e., the restored Z channel) and color data (collectively referred to as "a restored 3D image") temporarily in the computer-readable medium 226 for later output to a monitor 230 configured to display the restored 3D images. Optionally, the monitor 230 may be equipped with a keyboard 232 and/or a mouse 234 or other like peripheral device(s) for an analyst or viewer to select objects of interest (e.g., user-interface elements that permit control of input parameters to the receiver 106). Alternatively, the restored 3D images may be passed to the transmission chain 101.

Embodiments of the present invention are directed toward solving the problems of the prior art by employing depth maps associated with stereo or multiview imagery in order to transmit depth information economically. There are a variety of methods for generating depth maps from stereo or multi-view imagery that are out of scope of a description of the present application; however, the teachings in an article by of Yang et. al., titled "*Improved Real-Time Stereo on Commodity Graphics Hardware,*" Proceedings of the 2004 Conference on Computer Vision and Pattern Recognition Workshop (CVPRW'04) Volume 3, 2004, and in an article by Diaz et. al., titled "*Real-Time System for High-Image Resolution Disparity Estimation,*" IEEE Trans Image Process., 2007 January; 16(1):280-5, are instructive and are incorporated herein by reference in their entirety. Depth maps have peculiar statistical properties that may be advantageously employed by a suitable encoding process. In an article by Morvan et al., titled "*Platelet-based coding of depth maps for the transmission of multiview images,*" in Stereoscopic Displays and Virtual Reality Systems XIII. Edited by Woods, Andrew J. et al., Proceedings of the SPIE, Volume 6055, pp. 177-188 (2006), statistical properties are explored in more detail. Exemplary statistical properties include extremely strong tendencies towards piece-wise linearity characteristics. In other words, depth images contain large regions of gradual, linear changes bounded by sharp discontinuities that coincide with object boundaries in a color image.

With knowledge of these properties, according to an embodiment of the present invention, the transmitter 102 is configured to reduce the bandwidth of the depth maps (i.e., the Z channel) on the order of 500 to 1. Furthermore, the receiver 106 is configured to according to an embodiment of the present invention to produce a restored 3D image for display. This results in a depth-image-based rendering method which synthesizes one or more views at high quality for a stereoscopic or multiview auto-stereoscopic display. A particular advantage of systems designed according to embodiments of the present invention is that a resulting reduction in bandwidth is achieved which permits crude methods of digital watermarking to be employed to embed depth data (i.e., Z channel data) within RGB data of the view images themselves, robustly, even in the face of aggressive low-bit rate compression with codecs such as MPEG2.

A primary object of embodiments of the present invention is to reduce the bandwidth of the Z channel to a degree such that it can be transmitted via digital watermarking, in-band, within the RGB data, without affecting RGB quality. Furthermore, a suitably large reduction of bandwidth of the Z channel renders the problem of in-band transmission more amenable to perceptual coding of RGB data as compared with MPEG2 or H.264. This, in turn, solves a major problem—by decoupling the Z channel from the transmission method and bitstream, complete backwards compatibility with the existing broadcast and transmission chain is achieved. This is only possible with a drastic reduction of the overall transmission bandwidth of the Z channel. It will be appreciated by those skilled in the art that other methods of in-band and out-of-band transmission of Z channel data may be employed, such as supplemental audio channel data.

Figure 3A:
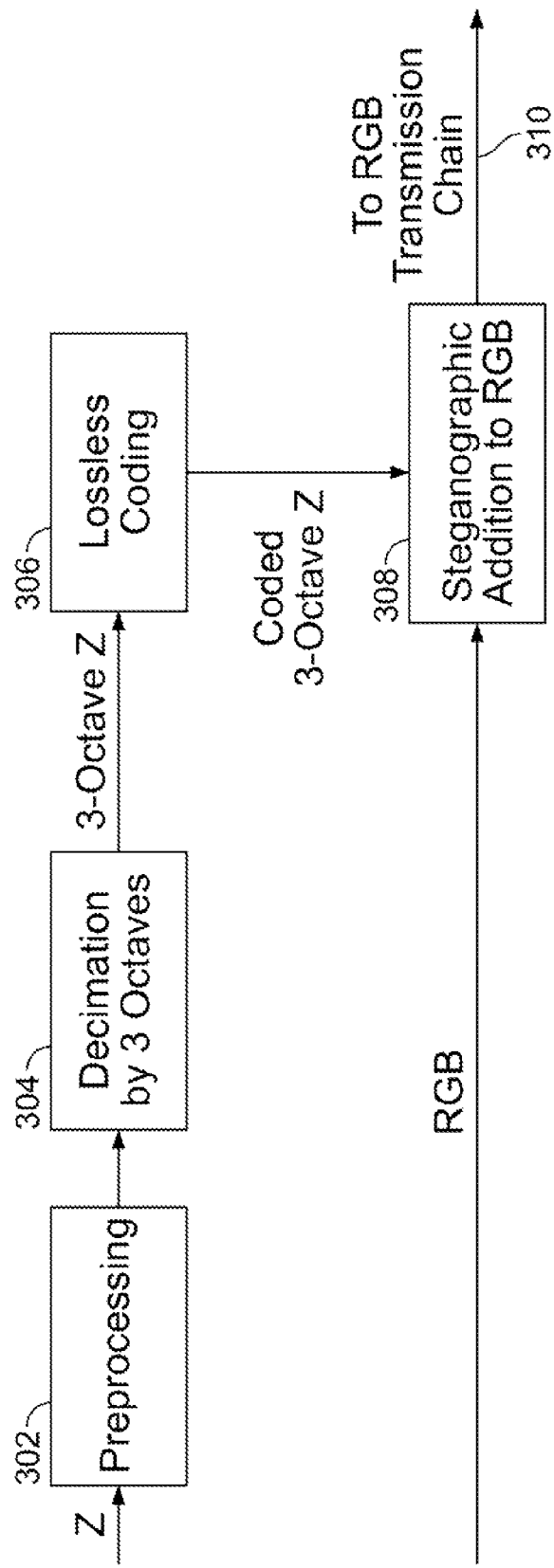
FIG. 3A is a block diagram illustrating exemplary steps of an RGB plus Z transformation and transmission method, according to an embodiment of the present invention.
Figure 3B:
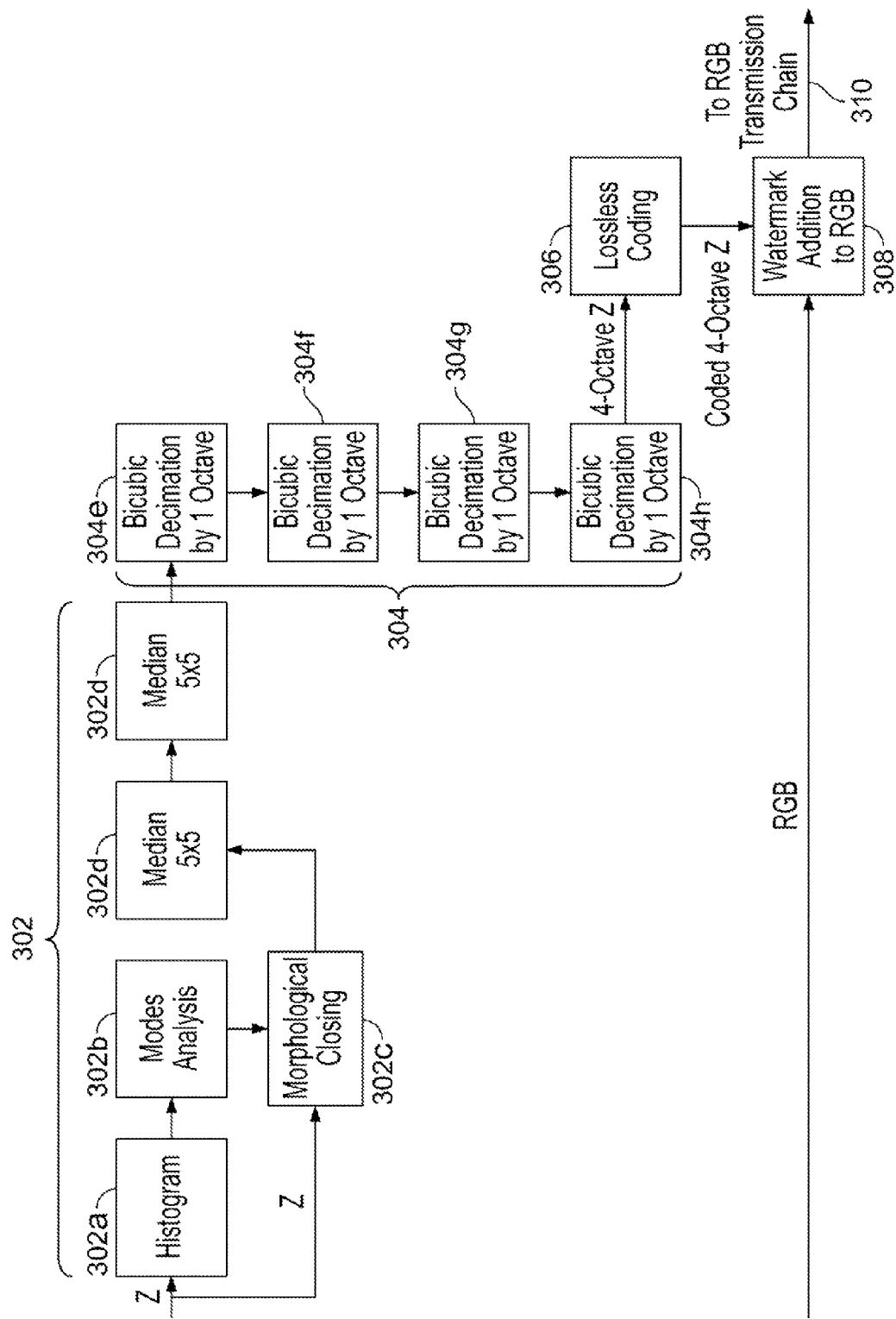
FIG. 3B is a more detailed block diagram of FIG. 3A, according to an embodiment of the present invention.

FIG. 3A shows a block diagram illustrating exemplary steps of an RGB plus Z (i.e., a color plus Z channel) transformation and transmission method according to an embodiment of the present invention. FIG. 3B presents the steps/blocks of FIG. 3A in further detail.

Figure 8:
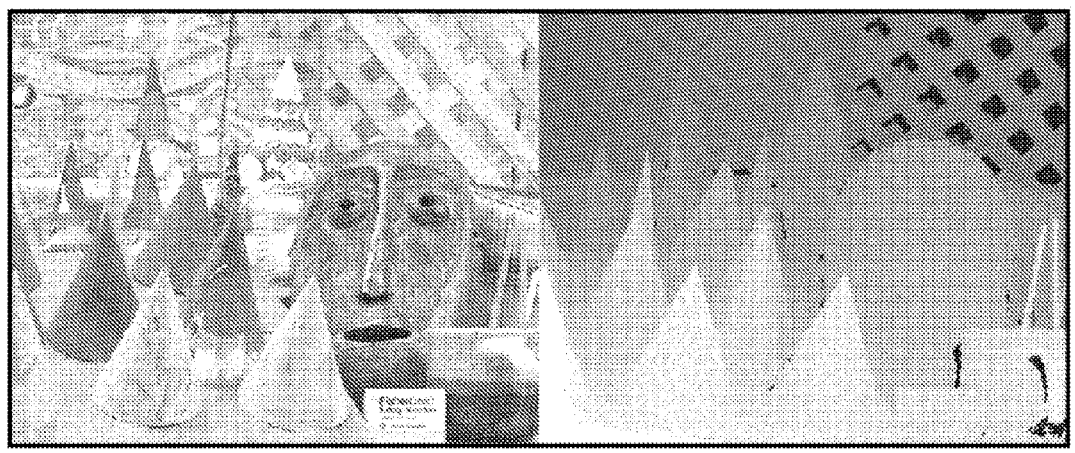
FIG. 8 shows a RGB plus Z pair corresponding to the stereoscopic image pair of FIG. 7.
Figure 9:
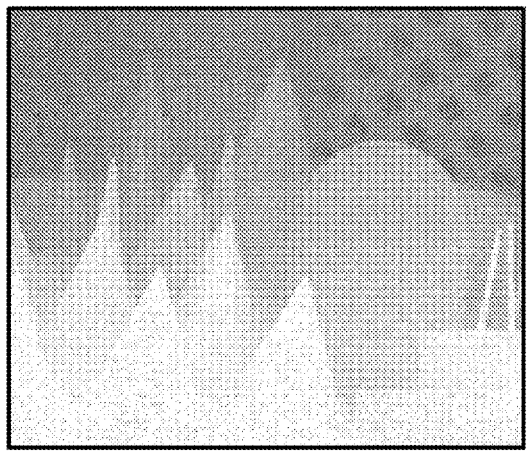
FIG. 9 shows the Z channel after treatment by a preprocessing step of the present invention.

For the steps illustrated in FIGS. 3A and 3B, it is assumed that the RGB data and the Z channel data are inputs to the transmitter 102 and/or the receiver 106 as described above in FIGS. 2A and 2B and further illustrated in FIG. 8. Referring now to FIGS. 3A and 3B, at step 302, a preprocessing step is performed on the Z channel data. In a preferred embodiment, the preprocessing step 302 includes sub-step 302a wherein a histogram of depth values is generated, and sub-step 302b wherein a modes analysis of the generated histogram is performed for identifying whether there is a significant modality in the distribution surrounding the 0.0 or 1.0 depth Z values. If sub-step 302b indicates that such a modality exists, then at sub-step 302c, a well-known grayscale morphological closing operation is performed to eliminate 0.0 and 1.0 clamped outliers (otherwise, the method passes on to step 302d hereinbelow). At sub-step 302d, the filtered data is processed by a median image processing filter one or more times in succession, which may be, for example, a 5×5 median filter run for two to three iterations. An example of a preprocessed depth map is shown in FIG. 9. The preprocessing sub-steps 302a-302d eliminate noise and outliers associated with numerical singularities and occlusion/disocclusion artifacts common in IR photogrammetry and disparity-estimated depth maps. Advantageously, preprocessing step 302 alters the Z channel to more fully match the piecewise-linearity assumption, without destroying useful range/depth data.

Figure 10:
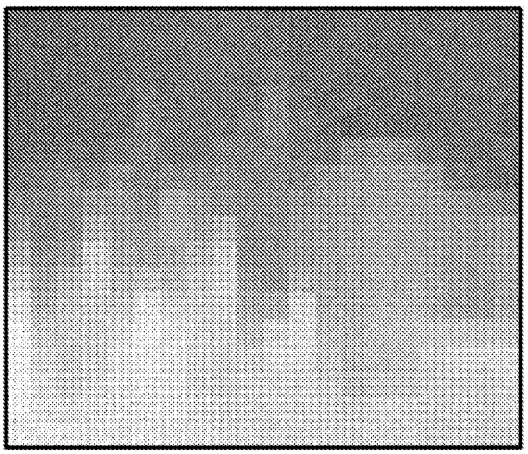
FIG. 10 shows a magnified view of the Z channel after treatment by the decimation step of the present invention.
Figure 11:
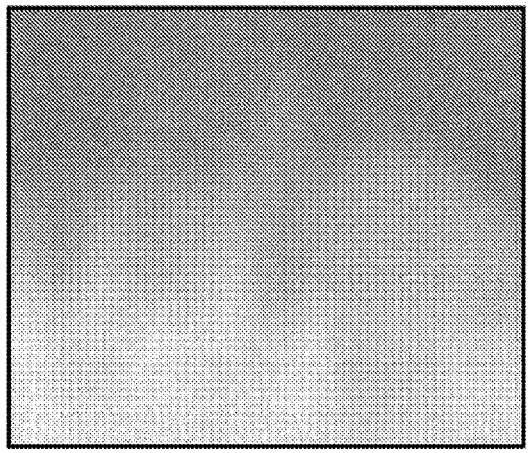
FIG. 11 shows the Z channel after a naive elliptical smoothing function has been applied.

At step 304, a spatial decimation operation is performed on the Z channel step 302. According to an embodiment of the present invention, step 304 may be implemented in a single step, such as the application of a cubic reduction filter. According to another embodiment of the present invention, a preferred, but slightly more expensive operation preserves more intermediate-scale details, namely, in sub-steps 304e-304h, to perform a repeated succession of one-octave bicubic reductions (e.g., the performance of four reductions which, reduces the data associated with the Z channel by a factor of 256). FIG. 10 depicts such a decimated Z channel. A person skilled in the art will appreciate that while the bandwidth of the Z channel has been drastically reduced, so has all or a portion of the fine-structure information—most importantly, the placement and orientation of object edges has been lost. A primary object of embodiments of the present invention is to restore this information at the reception end.

At step 306, an additional reduction in dynamic range followed by a lossless method of statistical coding may further reduce the dataset. In one preferred embodiment, the Z channel is transformed to a 7-bit-per-pixel representation and encoded statistically with a Huffman scheme. The overall data reduction ratio approaches 500 to 1 for typical Z channel video sequences. According to other embodiments of the present invention, application of a lossless method in step 306, may include, but is not limited to, other statistical coding schemes, such as arithmetic coding, and two-dimensional codebook schemes. According to one preferred embodiment, further reductions are possible with temporal prediction, and DCT-domain quantization of the decimated, dynamic-range reduced Z channel data.

At step 308, the reduced Z channel data may be steganographically added to the RGB data as a watermark. With the Z channel data transformed to a representation having approximately 500 times smaller bandwidth than the original RGB, it is now possible to use standard watermarking techniques to transmit the Z channel data within the RGB data as a digital watermark. Such standard watermarking techniques can be very robust to low-bitrate perceptual coding, such as MPEG2. A preferred embodiment encodes each of the 7 bits of a given decimated depth map value within the chrominance of the 4th-octave Z value's associated 16×16 RGB block. It will be understood by those skilled in the art that many existing watermarking embedding methods may be employed that are very robust so long as certain conditions are met, namely, the bandwidth of the watermark data itself is a significantly smaller bandwidth than the carrier data, otherwise the carrier data will be affected in a visible way. Additionally, a high bandwidth of the watermark payload relative to the carrier may expose the watermark to losses when downstream transformations are applied, such as perceptual encoding, cropping, scaling, and color gamut remapping. Embodiments of the present invention are directed to treating the Z channel data with sufficient reduction so as to allow any contemporaneous watermarking method to be employed successfully.

At step 310, the baseband video or image RGB data with the embedded watermark data is then treated as a normal RGB image or video signal that may be transmitted throughout the rest of a transmission chain.

Figure 13:
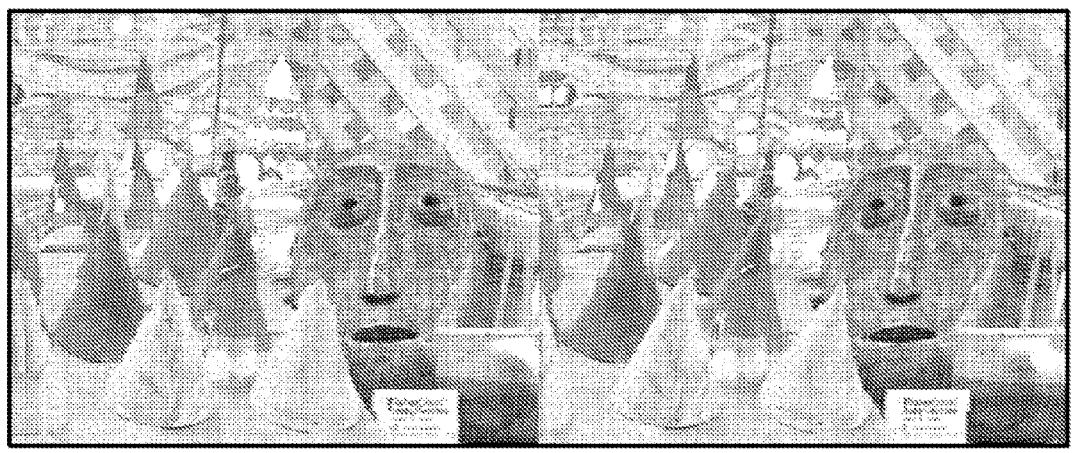
FIG. 13 shows a naïve reconstructed left and right eye stereoscopic image pair utilizing the decimated Z channel after up-scaling, via an exemplary depth-image-based rendering method according to an embodiment of the present invention.
Figure 14:
FIG. 14 shows a naïve reconstructed left and right eye stereoscopic image pair utilizing the decimated Z channel after up-scaling and processed by a smoothing function, via an exemplary depth-image-based rendering method according to an embodiment of the present invention.

A person skilled in the art will appreciate that direct utilization at a receiver of a transmitted, in-band, watermarked RGB data signal such a decimated Z channel, without some sort of restoration, is problematic. Utilizing such a Z channel as a depth map directly in a depth-image-based rendering framework may result in significant artifacts, as shown in FIG. 13. Noticeable blocking artifacts are visible in synthesized views. One method of restoration may simply smooth the decimated Z channel preferentially along the horizontal axis, after up-scaling according to any suitable technique, such as, for example, the technique described in an article by Tam et al., titled *"Non-Uniform Smoothing of Depth Maps Before Image-Based Rendering,"* in Three-Dimensional TV, Video, and Display III, Edited by Javidi, Bahram; Okano, Fumio, Proceedings of the SPIE, Volume 5599, pp. 173-183 (2004). The results of this approach are shown in FIG. 14, which demonstrates that significant geometric distortions of foreground objects are visible. These distortions are caused primarily when Z channel data crosses actual object boundaries. In fact, if sufficient smoothing is applied to completely eliminate the blocking artifacts, all spatial coherency between the Z channel and RGB channel is lost, causing severe geometric warping. Geometric disparities and shape dislocations between left and right eye views of this sort have been found to cause severe distress in viewers as taught in an article by Emoto, et al., titled *"Working Towards Developing Human Harmonic Stereoscopic Systems,"* in: Three-Dimensional Imaging, Visualization, and Display, edited by B. Javidi et al. (Springer-Verlag, New York, 2008) pp. 417-466.

Recalling the peculiar spatial characteristics of depth maps, namely, a tendency towards piecewise linearity, it may be observed that the sharp boundaries of an original depth map correlate strongly to object boundaries of a corresponding RGB image, transmitted according to the embodiment described above in connection with FIGS. 3A and 3B. According to an embodiment of the present invention, a two-domain bilateral filter (denoted by "RGBZO" and described in more detail hereinbelow) followed by one-octave up-scaling may be repeatedly applied to the watermarked RGB signal to smooth Z gradients within objects, while preserving and recreating the original edge discontinuities of the Z channel.

Figure 4:
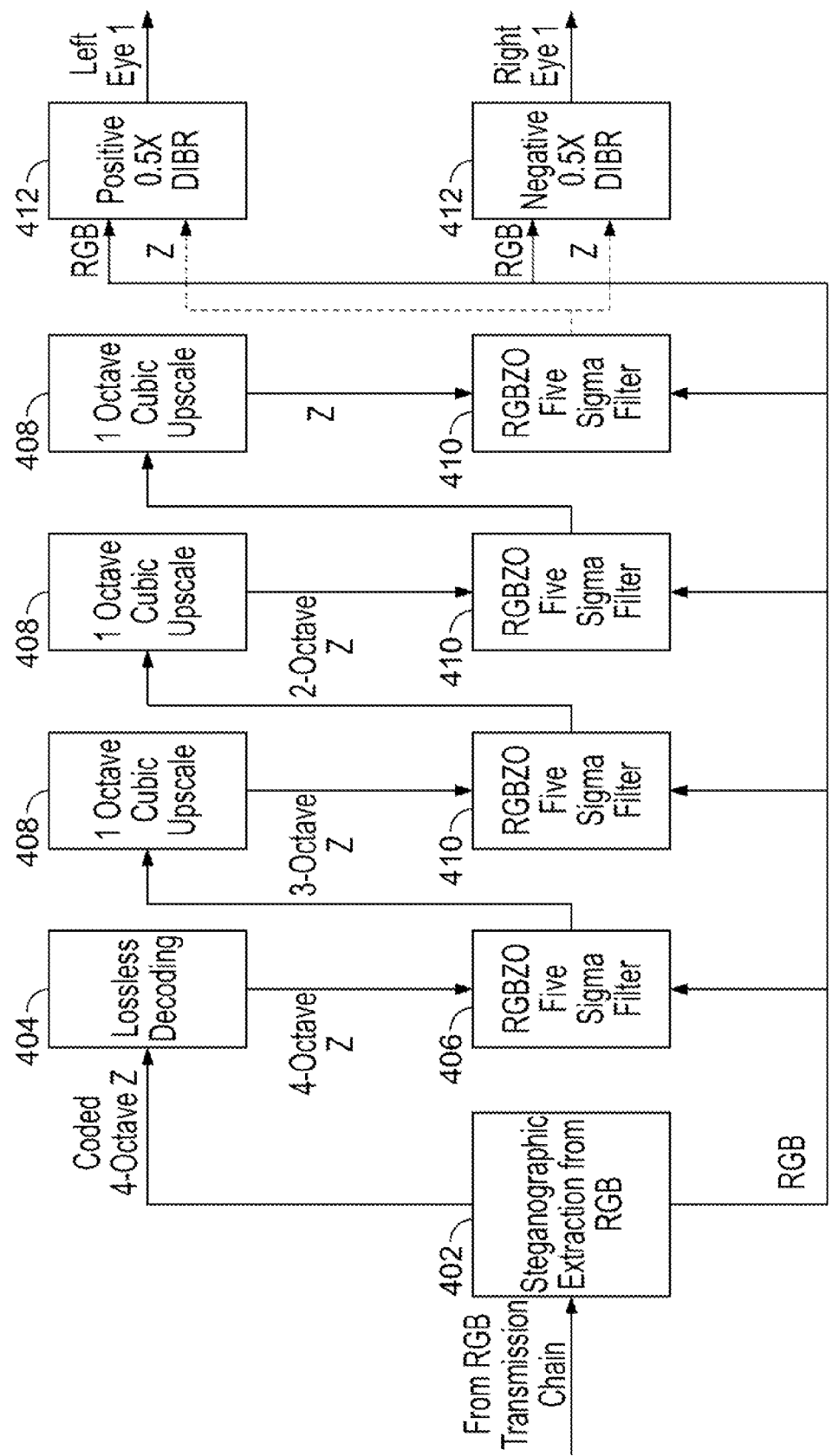
FIG. 4 is a block diagram illustrating exemplary steps of a reception and transformation method for stereoscopic displays, according to an embodiment of the present invention.
Figure 5:
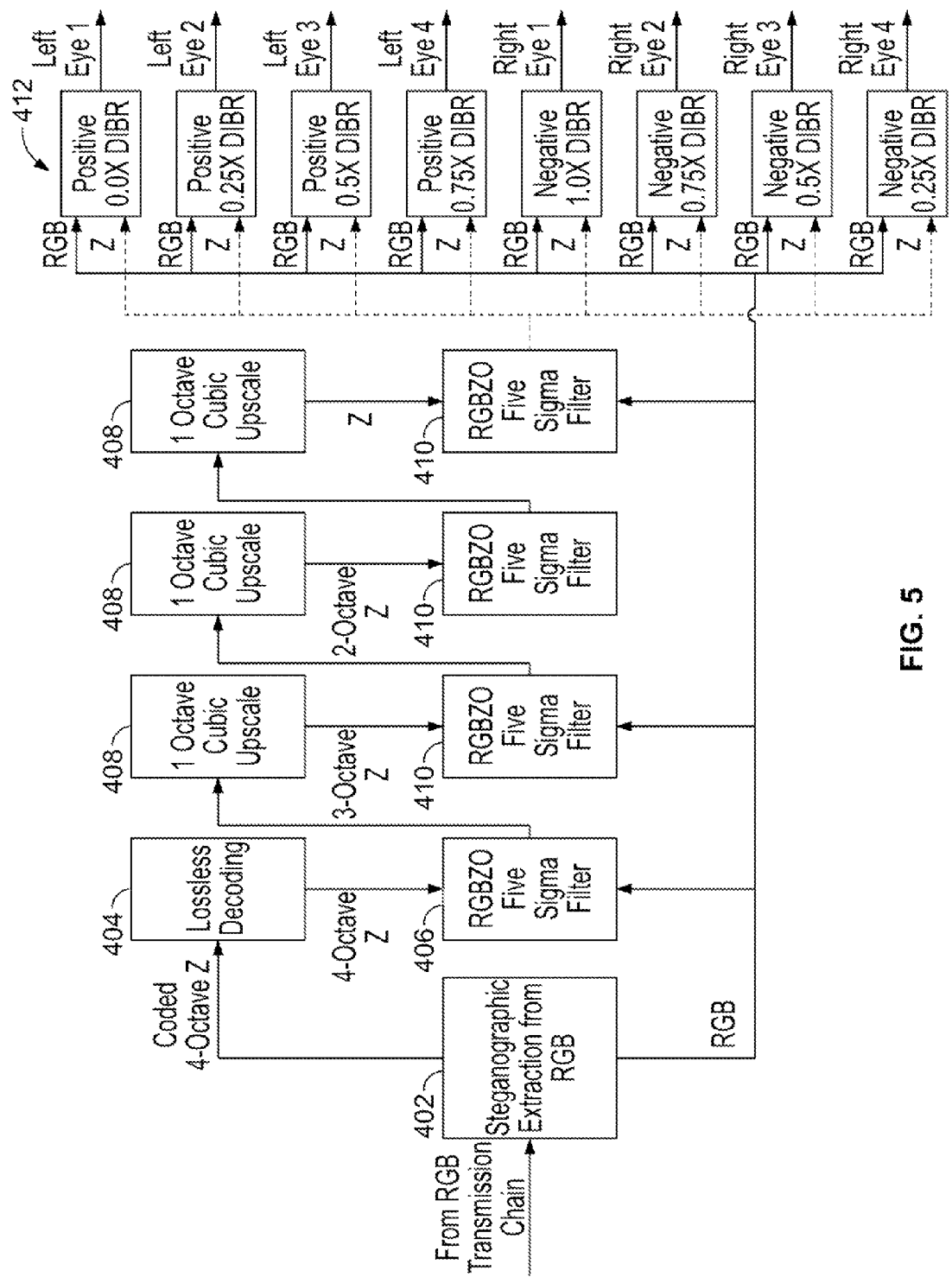
FIG. 5 is a block diagram illustrating exemplary steps of a reception and transformation method for multi-view auto-stereoscopic displays, according to an embodiment of the present invention.

FIG. 4 is a block diagram illustrating exemplary steps of a reception and transformation method for stereoscopic displays, while FIG. 5 depicts the method of FIG. 4 modified for multi-view auto-stereoscopic displays, according to embodiments of the present invention. Referring now to FIGS. 4 and 5, at the receiving end of a transmission channel, at step 402, the decimated Z channel watermark is steganographically extracted from the received RGB data. At step 404, the extracted Z watermark is subjected to a lossless decoding method. At step 406, the decoded Z channel data is subjected to a 2 factor 5-sigma/bilateral filter employing the statistical domain of the RGB data to treat the Z channel data. In steps 408, 410, the Z channel data is repeatedly subjected to successive turns of one-octave bicubic up-scaling, followed by a run of the RGBZO operation, until one RGBZO operation has been run upon the $1^{st}$ octave up-scaled Z channel. The output of the last RGBZO constitutes a "restored" Z channel, which along with the extracted RGB data, are subjected to a depth-image-based rendering (DIBR) method 412 whereby the "restored" Z channel data is used in order to warp the current RGB image to construct one or more additional views suitable for stereoscopic (FIG. 4) or auto-stereoscopic (FIG. 5) 3D displays.

The RGBZO bilateral filter of the present invention differs from prior art bilateral filters in several significant ways. A normal bilateral filter as defined in Equations 1 and 2 below calculates filter weights adaptively by spatial distance constituting a range, and radiosity distance constituting a domain within an image under analysis to drive weighting. More particularly, for input image Z, output image Z', and window of support $\Omega$, a typical bilateral filter is defined as follows in Eq. 1:

$$Z'_x = \frac{\sum_{\xi \in \Omega} g(\xi - x) r(Z_\xi - Z_x) Z_\xi}{\sum_{\xi \in \Omega} g(\xi - x) r(Z_\xi - Z_x)} \quad (1)$$

where g is a Gaussian spatial weighting function, and r is a radiosity weighting function. Typical values for radiosity include luminance or intensity of the constituent pixel samples. System input is typically supplied by constant factors $\sigma_s$ and $\sigma_r$ that modify the g and r functions as in Eq. 2 and 3:

$$g(\xi - x) = e^{-0.5\left(\frac{\|\xi - x\|}{\sigma_s}\right)^2} \quad (2)$$

$$r(\xi - x) = e^{-0.5\left(\frac{|Z(\xi) - Z(x)|}{\sigma_r}\right)^2} \quad (3)$$

The radiosity function r for the Z domain is defined by Eq. 3 above. Eq. 2 defines spatial weighting in the function g. Radiosity weighting is defined by Eqs. 4-7 and its accompanying description hereinbelow.

Smaller values of factors $\sigma_s$ and $\sigma_r$, increase the locality and similarity of spatial and radiosity weighting contributions, respectively. The L2 distance measure (i.e., the Euclidian distance) in the denominator of the exponential of radiosity function r is appropriate for images where only luminosity or intensity is enough to differentiate edges and boundary locality sufficiently.

In the preferred embodiment, a second image radiosity domain is provided by a second input of the RGB data, as function d in Eq. 4:

$$Z'_x = \frac{\sum_{\xi \in \Omega} g(\xi - x) r(Z_\xi - Z_x) d(RGB_\xi - RGB_x) Z_\xi}{\sum_{\xi \in \Omega} g(\xi - x) r(Z_\xi - Z_x) d(RGB_\xi - RGB_x)} \quad (4)$$

where the new second domain radiosity function d is defined by Eq 5:

$$d(\xi - x) = e^{-0.5\left(\frac{\delta(RGB(\xi) - RGB(x))}{\sigma_d}\right)^2} \quad (5)$$

and the function d measures not just luminosity difference, but a color difference measure in HSV color space. First, a hue value (as in HSV space) is calculated from the RGB color values as in Eq. 6:

$$\max RGB(x) = \max(R(x), G(x), B(x)) \quad (6)$$

$$\min RGB(x) = \min(R(x), G(x), B(x))$$

$$\text{chroma}(x) = \max RGB(x) - \min RGB(x)$$

$$\text{luma}(x) = RGB^T \cdot [0.3, 0.59, 0.1]$$

$$\text{Hue}(x) = \begin{cases} NaN, & \text{if chroma} = 0 \\ \frac{(G(x) - B(x))}{\text{chroma}} \mod 6, & \text{if } \max RGB(x) = R(x) \\ \frac{(B(x) - R(x))}{\text{chroma}} + 2, & \text{if } \max RGB(x) = G(x) \\ \frac{(R(x) - G(x))}{\text{chroma}} + 4, & \text{if } \max RGB(x) = B(x) \end{cases}$$

The function $\delta$ is defined as in Eq. 7:

$$\delta(x-\xi) = \min\{\text{abs}[\text{Hue}(x) - \text{Hue}(\xi)], \text{abs}[\text{Hue}(\xi) - \text{Hue}(x)]\} \times (\text{Luma}(\xi) - \text{Luma}(x)) \quad (7)$$

Similarly to the factors $\sigma_s$ and $\sigma_r$, the new factor $\sigma_d$ affects the locality of the similarity measure against the RGB data. The radiosity weighting is not just provided by the Z channel, but the RGB channels as well. This combined, calculated radiosity weighting is in turn applied to the Z channel output. A repeated iteration of this type of filtering operation has the effect of regularizing the output of the up-scaled Z channel, minimizing an error functional comprising the difference between the edge gradient of the Z channel versus the color edge gradient of the RGB channels. Assuming that both the RGB channels and Z channel are ranged from 0.0 to 1.0, an exemplary set of parameters for such RGBZO filters are:

$$\Omega = \{5,5\}$$

$$\sigma_s = 0.65000$$

$$\sigma_r = 0.06250$$

$$\sigma_d = 0.00825 \quad (8)$$

Figure 12:
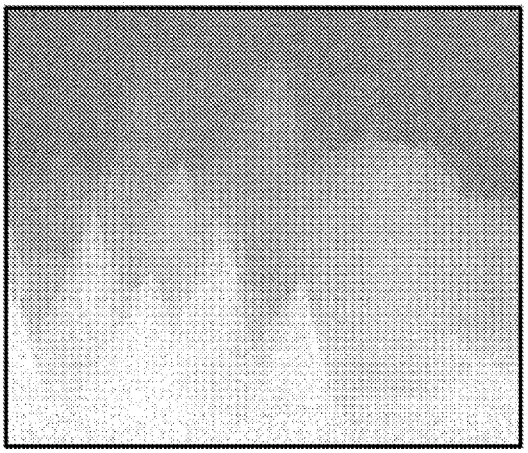
FIG. 12 shows the Z channel after statistical processing and restoration utilizing the RGB data as a domain.

This regularization step to "restore" the Z channel may be performed, according to an embodiment of the present invention, by means of a single up-scaling step from $4^{th}$ octave to $1^{st}$ octave, with a repeated iteration of the RGBZO operation upon the full resolution Z channel. This can be thought of as a gradient descent operation with repeated iterations until convergence. A result of the same quality with much less complexity may be achieved, according to an embodiment of the present invention, by successive turns of one-octave bicubic up-scaling, followed by a run of the RGBZO operation, until one RGBZO operation has been run upon the $1^{st}$ octave up-scaled Z channel as illustrated above in FIGS. 4 and 5. The results of the application of this method may be seen in FIG. 12, where the Z channel has been restored via the method described hereinabove. Clearly, the Z channel is now spatially correlated and a significant amount of the information lost in the decimation process at transmission has been restored.

Figure 15:
FIG. 15 shows a reconstructed left and right eye stereoscopic image pair utilizing the restored Z channel according to the preferred embodiment, via an exemplary depth-image-based rendering method.

According to an embodiment of the present invention, in the event that the above-described process does not result in a perfect restoration—wherein the combined transmission and reception methods can be likened to that of a lossy compression—the regenerated Z channel data produce stereoscopic reconstructions that mean observer scores suggest are largely indistinguishable from reconstructions using the original Z channel data. FIG. 15 shows such an exemplary restoration.

It will be appreciated by those skilled in the art that, according to embodiments of the method of the present invention, any estimation of depth maps may be performed at lower resolution and "treated" by the steps illustrated in FIG. 4 of the receiver 106 at any point of the transmission chain 101, or the method of the receiver 104 taught in FIG. 4 may be utilized to generate a highly spatially correlated, object-coherent, full-resolution depth map from a lower resolution and lower-accuracy depth map given a correlated RGB image. This permits coarse approximations of depth maps to be calculated and to be used, no matter their ultimate source. An example of another preferred embodiment would use a low-complexity method such as those taught in an article by Tam et al., titled *Depth Map Generation for 3-D TV: Importance of Edge and Boundary Information,"* in: Three-Dimensional Imaging, Visualization, and Display, edited by B. Javidi et al. (Springer-Verlag, New York, 2008) pp. 153-182, to estimate depth from other cues such as motion or blur at the receiver at low resolution, and use the present method of FIG. 4 to treat such depth maps prior to utilizing them for depth-image-based rendering.

Figure 6:
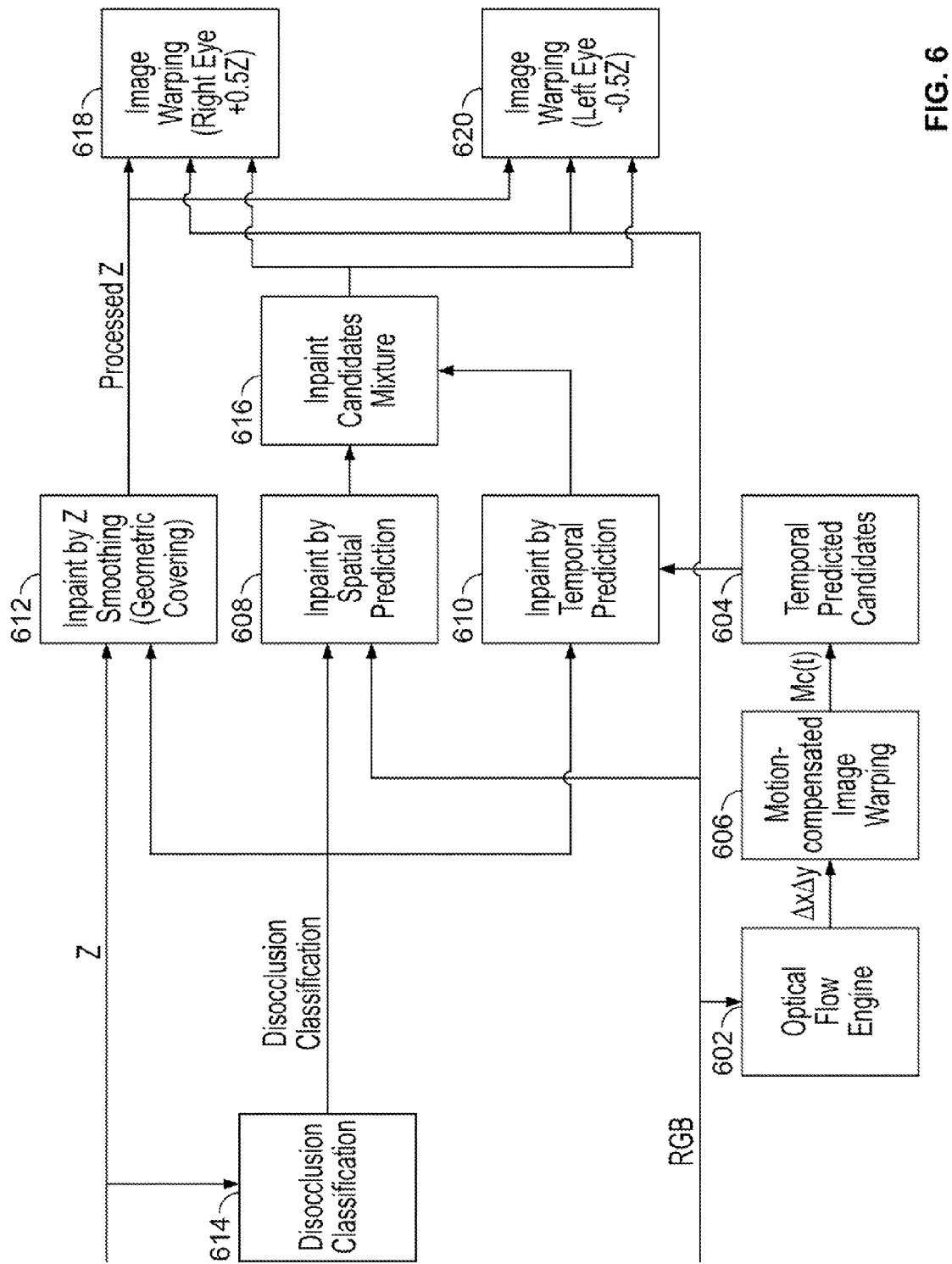
FIG. 6 is a block diagram illustrating exemplary steps of an exemplary depth-image-based rendering (DIBR) method employed by the receiver system of FIG. 2B, according to an embodiment of the present invention.

With a properly restored Z-channel in-hand to use as a depth map, what remains is to employ the Z channel to generate as many synthetic views as required by a display. In the case of a stereoscopic display, two views are necessary. An exemplary DIBR method is shown in FIG. 6, according to an embodiment of the present invention. A primary issue any DIBR method needs to deal with is occlusions. When a foreground object is to be displaced to the left, or to the right, such displacement may reveal background pixel data for which there is no explicit replacement. The occluded data needs to be predicted, either spatially, temporally, or a combination of both.

With an accurate optical flow method (block 602) such as that taught in the co-pending U.S. patent application Ser. No. 12/555,472, filed Sep. 8, 2009, and titled "System and Method for Determination of Optical Flow," which is incorporated herein by reference in its entirety, a probability table for each pixel comprising possible motion-compensated candidates (block 606) for filling in occluded pixels may be formed via motion-compensated image warping (block 604). Additionally, spatial prediction (block 608) utilizing the class of prediction algorithms known as "statistical in-painting" may be used if no suitable temporal predictions (block 610) are available. The term "in-painting" refers to a process for reconstructing lost or deteriorated parts of images and videos. Yet a third choice is to spatially blur the depth map itself (block 612), which has the effect of geometrically distorting foreground objects to cover such disocclusions.

In practice, the exemplary DIBR method uses geometric distortion for small-grade occlusions of less than 1% of image width, and chooses between temporal and spatial prediction based upon the availability and confidence measure of the temporal prediction probability table. In order to do this, an intermediate stage attempts to classify discocclusions (block 614) into one of four categories based on data manifest in the Z channel itself: left displacement, right displacement, full-Z-behind, full-Z-front. Additionally, the horizontal extent of the disocclusion is estimated. The horizontal extent is used to determine if local, directional blurring of the depth map covers the disocclusions without significant geometric distortion artifacts. Failing that, the presence of temporal prediction candidates is the second choice, and in the case no temporal prediction candidates are available, the classification of the disocclusion type (block 614) is used to inform the spatial prediction used by the in-paint procedure about which direction(s) to use when interpolating.

In blocks 618 and 620, left and right eye views may be obtained via image warping based on the in-paint candidates mixture (block 616) previously obtained in blocks 608, 610 and 612.

A benefit of employing a DIBR method such as that illustrated in FIG. 6 is that varying display sizes may be accommodated by preset or user supplied parameters. In the exemplary system, both virtual views may be simulated by means of two virtual cameras. Three user input parameters may be specified—a simulated interaxial distance, a simulated focal length for each virtual camera, and a simulated convergence point.

While the exemplary DIBR method of FIG. 6 regenerates the left-eye view along with the right-eye view, it will be appreciated by those skilled in the art that economy may be achieved by utilizing the original RGB as the left-eye view, and only synthesizing the right-eye at a 1× focal length instead of +0.5× and −0.5× focal lengths for both eye views.

In a similar manner to FIG. 4, FIG. 5 shows the same preferred embodiment with the same exemplary DIBR method used to generate an 8-view auto-stereoscopic output (blocks 412).

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method comprising:
receiving a reduced bandwidth 3D image comprising a reduced bandwidth depth map and color data;
applying, using a processor, a filter employing a statistical domain of the hue of the color data in a color space comprising a plurality of color channels to restore bandwidth of the reduced bandwidth depth map, the filter employing two radiosity weighting functions, the first radiosity weighting function provided by the reduced bandwidth depth map as a first domain, the second radiosity weighting function provided by a multi-channel color difference measure of the color data represented in the color space with at least one channel of the plurality of color channels incorporating a hue value of the color data and incorporating a gradient of the hue value of the color data as a second domain, the filter employing a spatial weighting function; and repeatedly subjecting the reduced bandwidth depth map to iterations of one-octave bicubic up-scaling followed by application of the filter until a first octave up-scaled depth map is produced, wherein repeatedly subjecting the reduced bandwidth depth map to iterations of one-octave bicubic up-scaling followed by application of the filter minimizes an error function comprising a difference between an edge gradient of the depth map and a color edge gradient of the color data to regularize output of the up-scaled depth map.

2. The method of claim 1, wherein the filter is configured to restore discontinuities in the reduced bandwidth depth map by matching discontinuities of the color data containing at least one object boundary.

3. The method of claim 1, further comprising applying a depth-image-based rendering (DIBR) method to warp the restored depth map and the color image to construct at least one view suitable for stereoscopic or auto-stereoscopic 3D displays.

4. The method of claim 3, wherein applying a DIBR method further comprises:
applying an optical flow method to the color data;
applying motion compensation and image warping to the color to produce a table of motion compensated pixels;
applying one of temporal predictions and spatial predictions of candidate occluded pixels from the table of motion compensated pixels;
applying a statistical in-painting procedure to the candidate occluded pixels; and
warping pixels obtained from the statistical in-painting procedure to obtain left and right eye views of images for display.

5. The method of claim 4, further comprising:
classifying disocclusions from the depth map to inform spatial predictions of candidate occluded pixels; and
applying a Z smoothing method to the depth map to produce a processed depth map.

6. The method of claim 5, wherein the warping is informed by the processed depth map.

7. The method of claim 1, further comprising applying a lossless decoding method to the reduced bandwidth depth map before repeatedly subjecting the reduced bandwidth depth map to iterations of one-octave bicubic up-scaling followed by application of the filter.

8. A non-transitory computer-readable data storage medium comprising computer-executable instructions for processing three-dimensional (3D) imagery, the instructions to:
receive a reduced bandwidth 3D image comprising a reduced bandwidth depth map and color data;
apply a filter employing a statistical domain of the hue of the color data in a color space comprising a plurality of color channels to restore bandwidth of the reduced bandwidth depth map, the filter employing two radiosity weighting functions, the first radiosity weighting function provided by the reduced bandwidth depth map as a first domain, the second radiosity weighting function provided by a multi-channel color difference measure of the color data represented in the color space with at least one channel of the plurality of color channels incorporating a hue value of the color data and incorporating a gradient of the hue value of the color data as a second domain, the filter employing a spatial weighting function; and
repeatedly subject the reduced bandwidth depth map to iterations of one-octave bicubic up-scaling followed by application of the filter until a first octave up-scaled depth map is produced, wherein repeatedly subjecting the reduced bandwidth depth map to iterations of one-octave bicubic up-scaling followed by application of the filter minimizes an error function comprising a difference between an edge gradient of the depth map and a color edge gradient of the color data to regularize output of the up-scaled depth map.

9. The non-transitory computer-readable data storage medium of claim 8, wherein the instructions are further to:
apply a depth-image-based rendering (DIBR) method to warp the restored depth map and the color image to construct at least one view suitable for stereoscopic or auto-stereoscopic 3D displays.

10. The non-transitory computer-readable data storage medium of claim 8, wherein the at least one filter is operable to employ a statistical domain of the color data to restore the bandwidth of the reduced bandwidth depth map.

11. A receiver for receiving and restoring at least one reduced bandwidth image comprising a reduced bandwidth depth map, the receiver to:
receive a reduced bandwidth 3D image comprising a reduced bandwidth depth map and color data;
apply a filter employing a statistical domain of the hue of the color data in a color space comprising a plurality of color channels to restore bandwidth of the reduced bandwidth depth map, the filter employing two radiosity weighting functions, the first radiosity weighting function provided by the reduced bandwidth depth map as a first domain, the second radiosity weighting function provided by a multi-channel color difference measure of the color data represented in the color space with at least one channel of the plurality of color channels incorporating a hue value of the color data and incorporating a gradient of the hue value of the color data as a second domain, the filter employing a spatial weighting function; and
repeatedly subject the reduced bandwidth depth map to iterations of one-octave bicubic up-scaling followed by application of the filter until a first octave up-scaled depth map is produced, wherein repeatedly subjecting the reduced bandwidth depth map to iterations of one-octave bicubic up-scaling followed by application of the filter minimizes an error function comprising a difference between an edge gradient of the depth map and a color edge gradient of the color data to regularize output of the up-scaled depth map.

12. The receiver of claim 11, wherein restoring bandwidth of the reduced bandwidth depth map is based on restoring discontinuities in the reduced bandwidth depth map by matching discontinuities of the color data containing at least one object boundary.

13. The receiver of claim 11, further comprising a depth-image-based rendering (DIBR) module for warping the restored depth map and the color data to construct at least one view suitable for stereoscopic or auto-stereoscopic 3D displays.

14. The receiver of claim 11, wherein the receiver is implemented using an application-specific integrated circuit (ASIC).

15. A system for transmitting, receiving, and rendering 3D imagery, comprising:
a transmitter for:
extracting a depth map and color data from at least one 3D image,
reducing spatial bandwidth of the depth map by applying one or more one-octave decimations to the depth map using a bicubic reduction filter, generating a histogram of depth values in the depth map,
removing depth values associated with a modality obtained from the histogram,
selecting the modality by computing the largest of a plurality of maxima values of the histogram to reduce the bit-per-pixel bandwidth of the depth map to produce a reduced bandwidth depth map,
inserting the reduced bandwidth depth map into the color data to produce a reduced bandwidth 3D image, and
transmitting the reduced bandwidth 3D image into a transmission channel; and a receiver for:
receiving a reduced bandwidth 3D image comprising a reduced bandwidth depth map and color data,
applying a filter employing a statistical domain of the hue of the color data in a color space comprising a plurality of color channels to restore bandwidth of the reduced bandwidth depth map, the filter employing two radiosity weighting functions, the first radiosity weighting function provided by the reduced bandwidth depth map as a first domain, the second radiosity weighting function provided by a multi-channel color difference measure of the color data represented in the color space with at least one channel of the plurality of color channels incorporating a hue value of the color data and incorporating a gradient of the hue value of the color data as a second domain, the filter employing a spatial weighting function,
repeatedly subject the reduced bandwidth depth map to iterations of one-octave bicubic up-scaling followed by application of the filter until a first octave up-scaled depth map is produced, wherein repeatedly subjecting the reduced bandwidth depth map to iterations of one-octave bicubic up-scaling followed by application of the filter minimizes an error function comprising a difference between an edge gradient of the depth map and a color edge gradient of the color data to regularize output of the up-scaled depth map, and
rendering the restored depth map and color data on a display.

16. The system of claim 15, wherein reducing bandwidth of the depth map comprises retaining at least one region of the depth map comprising at least one discontinuity that corresponds to at least one object boundary in the color data.

17. The system of claim 15, wherein the filter is configured to restore discontinuities in the reduced bandwidth depth map by matching discontinuities of the color data containing at least one object boundary.

* * * * *